United States Patent
Umetsu et al.

[11] Patent Number: 5,980,777
[45] Date of Patent: Nov. 9, 1999

[54] LIQUID CRYSTALLINE RESIN AND MOLDED PRODUCT THEREOF

[75] Inventors: Hideyuki Umetsu; Yoshiki Makabe, both of Nagoya; Toshihide Inoue, Ichinomiya, all of Japan

[73] Assignee: Toray Industries, Inc., Japan

[21] Appl. No.: 08/998,377

[22] Filed: Dec. 24, 1997

[30] Foreign Application Priority Data

Dec. 25, 1996 [JP] Japan .................................. 8-346338

[51] Int. Cl.$^6$ .............................. C09K 19/52; C08K 5/51; C08L 67/02; C08L 67/03
[52] U.S. Cl. .................. 252/299.01; 524/128; 524/135; 525/425; 525/444
[58] Field of Search ................. 252/299.01; 524/128, 524/135; 525/425, 444

[56] References Cited

U.S. PATENT DOCUMENTS

| | | | |
|---|---|---|---|
| 4,639,504 | 1/1987 | Cottis | 528/176 |
| 4,764,582 | 8/1988 | Hisgen et al. | 528/183 |
| 4,942,087 | 7/1990 | Motooka et al. | 428/332 |
| 5,326,848 | 7/1994 | Kashimura et al. | 528/190 |
| 5,514,739 | 5/1996 | Aketa et al. | 524/108 |
| 5,679,284 | 10/1997 | Kurita | 252/299.01 |

FOREIGN PATENT DOCUMENTS

| | | |
|---|---|---|
| 0 276 874 | 8/1988 | European Pat. Off. |
| 8-53605 | 2/1996 | Japan |

*Primary Examiner*—Shean C. Wu
*Attorney, Agent, or Firm*—Austin R. Miller

[57] ABSTRACT

A liquid crystalline resin which comprises at least one kind of liquid crystalline polymer selected from liquid crystalline polyester and liquid crystalline polyester amide, both forming an anisotropic molten phase, and an inorganic phosphorus compound, said liquid crystalline resin having an absorbance of 0.5 or less at 380 nm when measured over an optical path length of 10 mm in a 0.5 wt % solution in a 1:1 mixed solvent of pentafluorophenol and chloroform (by weight). It is useful as engineering plastics because of improved color, heat resistance, and hydrolytic resistance.

8 Claims, No Drawings

LIQUID CRYSTALLINE RESIN AND MOLDED PRODUCT THEREOF

BACKGROUND OF THE INVENTION

1. Field of the Invention

The present invention relates to an improved liquid crystalline resin, and more particularly, to a liquid crystalline resin and a molded product thereof improved in color, hydrolytic resistance, and heat resistance, with reduced evolution of acetic acid during residence in the molding machine.

2. Description of the Related Art

Plastics having new functions have recently been developed one after another to meet demands for sophisticated technologies. One of them is an optically anisotropic liquid crystalline polymer characterized by molecular chains arranged parallel to one another. It is attracting attention because of its good flowability and mechanical properties. In addition, it finds increasing use for small molded products in the electric and electronic industries and the field of office machines and equipment on account of its high rigidity.

Known examples of liquid crystalline polymers are given below.

- a copolymer of p-hydroxybenzoic acid and polyethylene terephthalate. (Japanese Patent Publication No. 18016/1981)
- a copolymer of p-hydroxybenzoic acid, polyethylene terephthalate, aromatic diol (such as 4,4'-dihydroxybiphenyl), and aromatic dicarboxylic acid, with improved flowability and heat resistance. (Japanese Patent Laid-open No. 30523/1988)
- a copolymer of p-hydroxybenzoic acid, 4,4'-dihydroxybiphenyl, t-butylhydroquinone, and terephthalic acid. (Japanese Patent Laid-open No. 164719/1987)
- a copolymer of p-hydroxybenzoic acid, 4,4'-dihydroxybiphenyl, isophthalic acid, and terephthalic acid. (Japanese Patent Publication No. 24407/1982 and Japanese Patent Laid-open No. 25046/1985)
- a copolymer of p-hydroxybenzoic acid and 6-hydroxy-2-naphthoic acid. (Japanese Patent Laid-open No. 77691/1979)

The above-mentioned liquid crystalline polymers, however, are liable to discoloration during polymerization and molding and also to thermal degradation that aggravates mechanical properties because of their relatively high melting point compared with ordinary polyesters such as polyethylene terephthalate and polybutylene terephthalate. Several countermeasures have been devised as follows.

- incorporation with a heat stabilizer (such as organophosphorus compound and hindered phenol) at the time of polymerization, for improvement in long-term heat resistance. (Japanese Patent Publication No. 51524/1990).
- incorporation of phosphorous acid or phosphinic acid or a metal salt thereof into liquid crystalline polyester and/or liquid crystalline polyester amide. (Japanese Patent Laid-open No. 53605/1996)
- incorporation with an organophosphorus compound while the reaction product is still in molten state. (Japanese Patent Laid-open No. 32880/1994)
- incorporation of an organophosphorus compound into a resin composed of non-liquid crystalline polyester and liquid crystalline polyester.

The above-mentioned prior art technologies have been found unsatisfactory as follows.

- the heat stabilizer disclosed in Japanese Patent Publication No. 51524/1990 is not totally effective against thermal degradation (leading to discoloration) during residence in the molding machine.
- the liquid crystalline polymer disclosed in Japanese Patent Laid-open No. 30523/1988 is subject to slight discoloration due to residues of acetylating agent added in excess (1.1 times in mol for the terminal hydroxyl group) at the time of polymerization.
- the procedure disclosed in Japanese Patent Laid-open No. 53605/1996 is not applicable to products which need a good color because an acetylating agent is added in excess at the time of polymerization as in the case just mentioned above.
- the procedure disclosed in Japanese Patent Laid-open No. 32880/1994 is not effective against discoloration because of incorporation with an organophosphorus compound as well as an acetylating agent in excess amount.
- the procedure disclosed in Japanese Patent Laid-open No. 17974/1995 is not effective against discoloration because of incorporation with an organophosphorus compound.

OBJECT AND SUMMARY OF THE INVENTION

The present invention was completed to address the above-mentioned problems. It is an object of the present invention to provide a resin composition and a molded product thereof which are characterized by non-discoloration, good thermal properties (or resistance to dry heat deterioration during residence in the molding machine), good hydrolytic resistance, and reduced evolution of acetic acid detrimental to the extruder and molding machine.

The first aspect of the present invention resides in a liquid crystalline resin which comprises at least one kind of liquid crystalline polymer selected from liquid crystalline polyester and liquid crystalline polyester amide, both forming an anisotropic molten phase, and an inorganic phosphorus compound, said liquid crystalline resin having an absorbance of 0.5 or less at 380 nm when measured over an optical path length of 10 mm in a 0.5 wt % solution in a 1:1 mixed solvent of pentafluorophenol and chloroform (by weight).

The second aspect of the present invention resides in the liquid crystalline resin defined in the first aspect, wherein the inorganic phosphorus compound is at least one member selected from phosphorous acid, phosphinic acid, and metal salts thereof in an amount of 0.001 to 5 parts by weight for 100 parts by weight of the liquid crystalline polymer.

The third aspect of the present invention resides in the liquid crystalline resin defined in the second aspect, in which at least one member selected from phosphorous acid, phosphinic acid, and metal salts thereof is a sodium salt of phosphorous acid and/or phosphinic acid.

The fourth aspect of the present invention resides in the liquid crystalline resin as defined in any of the first to third aspects which comprises a liquid crystalline polyester composed of structural units represented by the formulas (I), (II), and (IV) below or a liquid crystalline polyester composed of structural units represented by the formulas (I), (II), (III), and (IV) below.

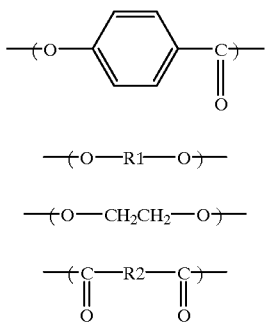

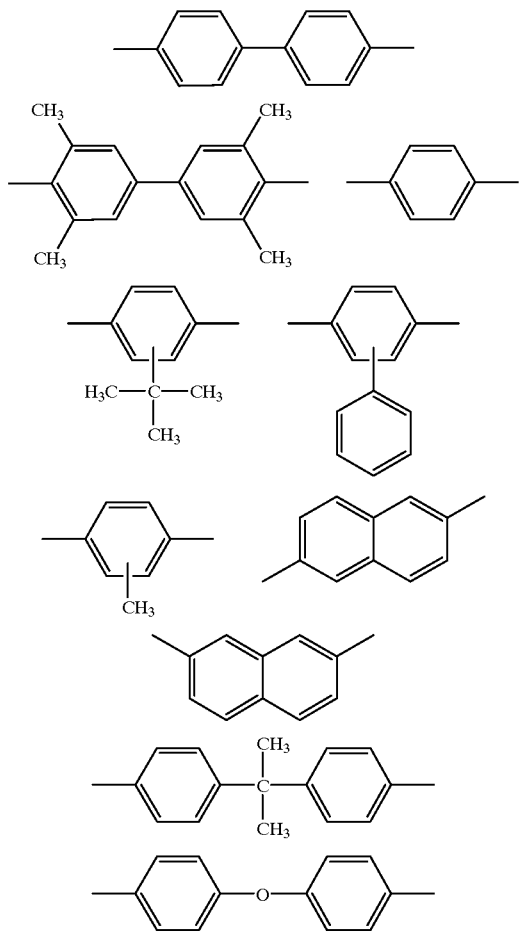

(where $R_1$ denotes at least one kind of the group selected from those represented by the formulas below, and $R_2$ denotes at least one kind of the group selected from those represented by the formula below,

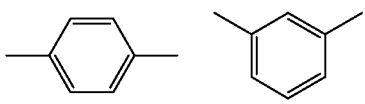

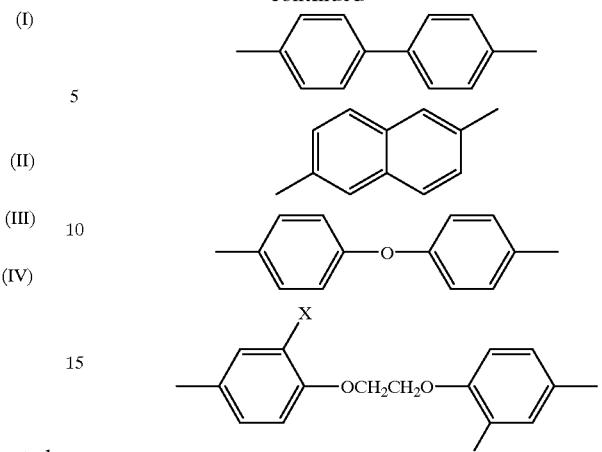

with X standing for a hydrogen atom or chlorine atom.)

The fifth aspect of the present invention resides in a liquid crystalline resin composition which comprises a liquid crystalline resin in an amount of 100 parts by weight and an inorganic filler in an amount of 5 to 300 parts by weight, said liquid crystalline resin being composed of at least one kind of liquid crystalline polymer selected from liquid crystalline polyester and liquid crystalline polyester amide, both forming an anisotropic molten phase, and an inorganic phosphorus compound, said liquid crystalline resin having an absorbance of 0.5 or less at 380 nm when measured over an optical path length of 10 mm in a 0.5 wt % solution in a 1:1 mixed solvent of pentafluorophenol and chloroform (by weight).

The sixth aspect of the present invention resides an improved process for producing a liquid crystalline resin including the steps of reacting a liquid crystalline polyester-forming raw material and/or a liquid crystalline polyester amide-forming raw material containing at least one member selected from hydroxycarboxylic acids, dihydroxy compounds, and dicarboxylic acids in the presence of an acylating agent, thereby producing a liquid crystalline polyester and/or liquid crystalline polyester amide, wherein the improvement comprises adding at least one kind of compound selected from phosphorous acid, phosphinic acid, and metal salts thereof and adjusting the amount of the acylating agent such that the molar ratio of the functional groups in the acylating agent capable of acylating hydroxyl groups to the hydroxyl groups in the starting monomer is less than 1.1.

The seventh aspect of the present invention resides in the process for producing a liquid crystalline resin as defined in the sixth aspect, wherein the liquid crystalline polyester-forming raw material and/or a liquid crystalline polyester amide-forming raw material is one which further contains at least one member selected from polyalkylene terephthalate and amino group-containing monomer.

The eighth aspect of the present invention resides in a molded product of a liquid crystalline resin or a liquid crystalline resin composition, said liquid crystalline resin comprising at least one kind of liquid crystalline polymer selected from liquid crystalline polyester and liquid crystalline polyester amide, both forming an anisotropic molten phase, and an inorganic phosphorus compound, said liquid crystalline resin having an absorbance of 0.5 or less at 380 nm when measured over an optical path length of 10 mm in a 0.5 wt % solution in a 1:1 mixed solvent of pentafluorophenol and chloroform (by weight), and said liquid crystalline resin composition comprising a liquid crystalline resin in an amount of 100 parts by weight and an inorganic filler in an amount of 5 to 300 parts by weight.

The ninth aspect of the present invention resides in the molded product of liquid crystalline resin as defined in the eighth aspect, wherein the molded product is of small size.

DESCRIPTION OF THE PREFERRED EMBODIMENTS

According to the present invention, the liquid crystalline resin comprises at least one kind of liquid crystalline polymer selected from liquid crystalline polyester and liquid crystalline polyester amide, both forming an anisotropic molten phase, and an inorganic phosphorus compound. The liquid crystalline resin has an absorbance of 0.5 or less, preferably 0.4 or less, particularly 0.3 or less, at 380 nm when measured over an optical path length of 10 mm in a 0.5 wt % solution in a 1:1 mixed solvent of pentafluorophenol and chloroform (by weight). An absorbance greater than specified above is due to discoloration by oxidative deterioration, and it indicates that the liquid crystalline resin is poor in color and mechanical properties.

The absorbance of the liquid crystalline resin is measured in the following manner. First, a sample of the liquid crystalline resin is dissolved in pentafluorophenol at 50° C. slowly over 4 hours to give a 1 wt % solution. Second, the solution is diluted with chloroform to give a 0.5 wt % solution. Third, the solution is placed in a quartz glass cell having an optical path length of 10 mm, and the intensity of transmitted light and the intensity of incident light are measured at 380 nm using a spectrophotometer (Model UV-240 made by Shimadzu Corporation), with the mixed solvent being a blank. The absorbance is calculate from the formula below.

$$\text{Absorbance} = -\log\frac{\text{Intensity of transmitted light}}{\text{Intensity of incident light}}$$

The liquid crystalline polymer used in the present invention is at least one kind selected from liquid crystalline polyester and liquid crystalline polyester amide, both forming an anisotropic molten phase. The liquid crystalline polyester includes those which are composed of oxycarbonyl units (such as aromatic oxycarbonyl units), dioxy units (such as aromatic dioxy units and alkylene (e.g. ethylene) dioxy units), or dicarbonyl units (such as aromatic dicarbonyl units). They form an anisotropic molten phase. The liquid crystalline polyester amide includes those which are composed of at least one kind of the above-mentioned structural units and at least one kind of structural units selected from aromatic iminocarbonyl units, aromatic diimino units, and aromatic iminooxy units. They form an anisotropic molten phase.

Examples of the liquid crystalline polyester forming an anisotropic molten phase include the one which is composed of structural units represented by the formulas (I), (II), and (IV) below or the one which is composed of structural units represented by the formulas (I), (II), (III), and (IV) below.

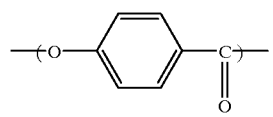
(I)

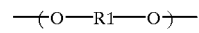
(II)

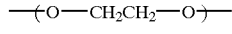
(III)

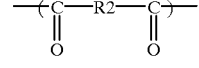
(IV)

where $R_1$ denotes at least one kind of the group selected from those represented by the formulas below,

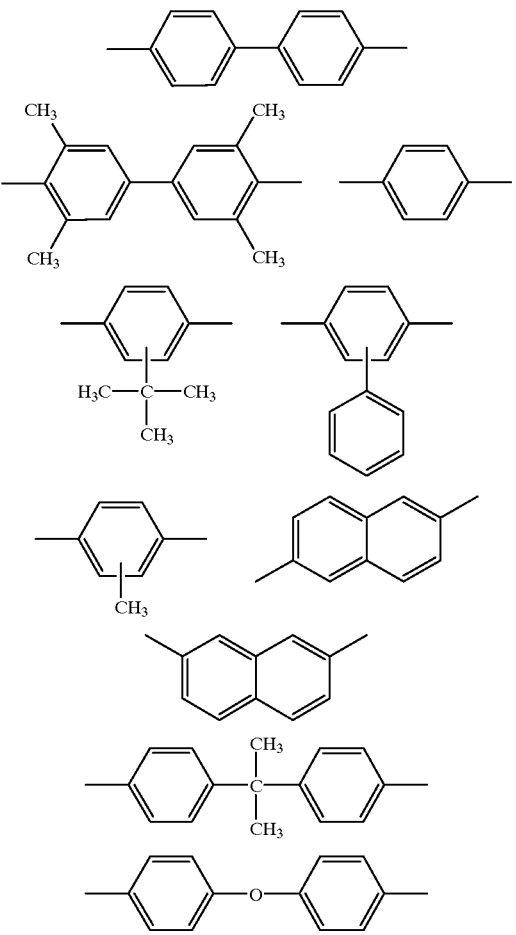

and $R_2$ denotes at least one kind of the group selected from those represented by the formula below,

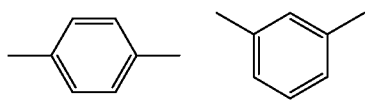

-continued

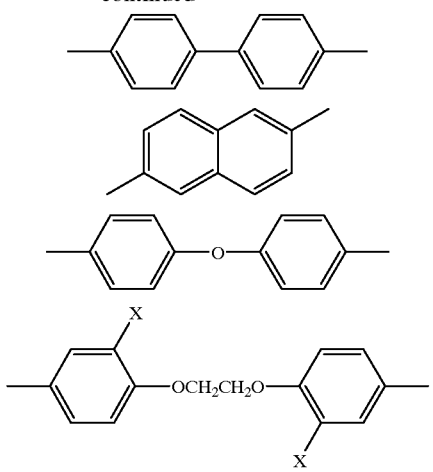

with X standing for a hydrogen atom or chlorine atom.)

Incidentally, it is desirable that the total molar quantity of the structural units (II) and (III) be substantially equal to the molar quantity of the structural unit (IV).

The structural unit (I) is one which is derived from p-hydroxybenzoic acid. The structural unit (II) is one which is derived from an aromatic dihydroxy compound selected from 4,4'-dihydroxybiphenyl, 3,3',5,5'-tetramethyl-4,4'-dihydroxybiphenyl, hydroquinone, t-butylhydroquinone, phenylhydroquinone, 2,6-dihydroxynaphthalene, 2,7-dihydroxynaphthalene, 2,2-bis(4-hydroxyphenyl)propane, and 4,4'-dihydroxydiphenyl ether. The structural unit (III) is one which is derived from ethylene glycol. The structural unit (IV) is one which is derived from an aromatic dicarboxylic acid selected from terephthalic acid, isophthalic acid, 4,4'-diphenyldicarboxylic acid, 2,6-naphthalenedicarboxylic acid, 1,2-bis(phenoxy)ethane-4,4'-dicarboxylic acid, 1,2-bis(2-chlorophenoxy)ethane-4,4'-dicarboxylic acid, and 4,4'-diphenylether dicarboxylic acid.

Examples of the liquid crystalline polyester amide include one which is formed from 2,6-hydroxynaphthoic acid, p-aminophenol, and terephthalic acid; one which is formed from p-hydroxybenzoic acid, 4,4'-dihydroxybiphenyl, and terephthalic acid; and one which is formed from p-aminobenzoic acid and polyethylene terephthalate. (See Japanese Patent Laid-open No. 33123/1989.)

In the present invention, the liquid crystalline polyester should preferably be a copolymer composed of the above-mentioned structural units (I), (II), and (IV), or a copolymer composed of the above-mentioned structural units (I), (II), (III), and (IV). The amount of each structural unit is not necessarily restricted; however, it should preferably be restricted as follows from the standpoint of fluidity of the polymer.

In the case where the polymer contains the structural unit (III), the total amount of the structural units (I) and (II) should be 35–95 mol %, preferably 40–93 mol %, for the total amount of the structural units (I), (II), and (III), so that the polymer has good heat resistance, flame retardance, and mechanical properties. The amount of the structural unit (III) should be 65–5 mol %, preferably 60–7 mol %, of the total amount of the structural units (I), (II), and (III). The molar ratio of the structural unit (I) to the structural unit (II) should be from 70/30 to 95/5, preferably from 75/25 to 93/7, so that the polymer has balanced heat resistance and flowability. The amount of the structural unit (IV) should preferably be substantially equal in mole to the total amount of the structural units (II) and (III).

On the other hand, in the case where the polymer does not contain the structural unit (III), the amount of the structural unit (I) should preferably be 40–90 mol %, particularly 60–88 mol %, of the total amount of the structural units (I) and (II). The amount of the structural unit (IV) should preferably be substantially equal in mole to the amount of the structural unit (II).

The above-mentioned liquid crystalline polymer used in the present invention may contain any of the following comonomers in small amounts not harmful to the liquid crystal properties, in addition to components constituting the above-mentioned structural units (I) to (IV).

aromatic dicarboxylic acids, such as 3,3'-diphenyldicarboxylic acid and 2,2'-diphenyldicarboxylic acid.

aliphatic dicarboxylic acid, such as adipic acid, azelaic acid, sebacic acid, and dodecanedionic acid.

alicyclic dicarboxylic acid, such as hexahydroterephthalic acid.

aromatic diols, such as chlorohydroquinone, methylhydroquinone, 4,4'-dihydroxydiphenylsulfone, 4,4'-dihydroxydiphenylsulfide, and 4,4'-dihydroxybenzophenone.

aliphatic and alicyclic diols, such as 1,4-butanediol, 1,6-hexanediol, neopentyl glycol, 1,4-cyclohexanediol, and 1,4-cyclohexanedimethanol.

aromatic hydroxycarboxylic acids, such as m-hydroxybenzoic acid and 2,6-hydroxynaphthoic acid.

p-aminophenol and p-aminobenzoic acid, and derivatives thereof.

According to the present invention, the liquid crystalline resin contains at least one member selected from phosphorous acid, phosphinic acid, and metal salts thereof. The metal salts are those of alkali metal (such as lithium, sodium, and potassium) and alkaline earth metal (such as magnesium, calcium, and barium), the former being preferable. Examples of the metal salts include calcium hypophosphite, magnesium hypophosphite, barium hypophosphite, sodium hypophosphite, potassium hypophosphite, potassium phosphite, magnesium phosphite, barium phosphite, and sodium phosphite. Of these examples, sodium hypophosphite and sodium phosphite are desirable.

The amount of the phosphorous acid and phosphinic acid and metal salts thereof should be 0.0001 to 5 parts by weight, preferably 0.01 to 3 parts by weight, for 100 parts by weight of the liquid crystalline resin, so that the liquid crystalline resin has good color, heat resistance, and mechanical properties.

The timing of adding any of phosphorous acid and phosphinic acid and metal salts thereof should preferably be before the completion of polymerization, so that the resulting liquid crystalline resin has a good color.

The phosphorous acid and phosphinic acid and metal salts thereof may be added in the form of solid (at normal temperature) or liquid (at temperatures higher than their melting point). For compounding at low temperatures, they may be added in the form of solution.

The liquid crystalline resin of the present invention may be incorporated with an inorganic or organic metal salt other than the above-mentioned phosphite and hypophosphite, so that it has improved residence stability. Preferred examples of such metal salts include alkali metal salts and alkaline earth metal salts of sulfuric acid, hydrogen halide, nitric acid, boric acid, phosphoric acid, pyrophosphoric acid, acetic acid, oxalic acid, and benzoic acid. Their concrete examples are potassium sulfate, sodium acetate, barium acetate, magnesium acetate, sodium benzoate, and sodium hydrogen phosphate.

The amount of metal salts other than phosphite and hypophosphite is usually 0.001 to 5 parts by weight, preferably 0.01 to 3 parts by weight, for 100 parts by weight of the liquid crystalline polyester.

The metal salts other than phosphite and hypophosphite may be added in the form of solid (at normal temperature) or liquid (at temperatures higher than their melting point). For compounding at low temperatures, they may be added in the form of solution.

The liquid crystalline resin of the present invention may be produced in any manner so long as it has the absorbance specified above. However, the following process is desirable for good color, heat resistance, and hydrolytic resistance. The process consists of reacting a liquid crystalline polyester-forming raw material and/or a liquid crystalline polyester amide-forming raw material containing at least one member selected from hydroxycarboxylic acids, dihydroxy compounds, and dicarboxylic acids (and optionally at least one member selected from polyalkylene terephthalate and amino group-containing monomer) in the presence of an acylating agent, thereby producing a liquid crystalline polyester and/or liquid crystalline polyester amide. The amount of the acylating agent should be such that the molar ratio of the functional groups in the acylating agent capable of acylating hydroxyl groups to the hydroxyl groups in the starting monomer is relatively small.

Examples of the acylating agent include acetic anhydride, propionic anhydride, butyric anhydride, and benzoic anhydride. Acetic anhydride is preferable from the standpoint of reactivity.

The molar ratio of the functional groups in the acylating agent capable of acylating hydroxyl groups to the hydroxyl groups in the starting monomer should be relatively small, so that the evolution of acetic acid during residence is decreased. To be specific, the molar ratio should be less than 1.1, preferably less than 1.090, more preferably less than 1.080. The lower limit is not specifically restricted; however, it should be higher than 1.0, preferably higher than 1.02, more preferably higher than 1.05, so that the resulting liquid crystalline polymer has an adequate degree of polymerization.

The liquid crystalline polymer tends to decrease in the degree of polymerization with the decreasing amount of the acylating agent. This disadvantage can be eliminated by adding at least one member selected from phosphorous acid and phosphinic acid and metal salts thereof at the time of polymerization. The resulting polymer will have a sufficient degree of polymerization and the liquid crystalline resin has a good color and evolves only a small amount of acetic acid during residence.

The acylating agent should be added in such a manner that acylation takes place before polycondensation. Acylation should be carried out at 80 to 300° C., preferably 100 to 250° C., under a nitrogen stream.

Polycondensation can be carried out in the same way as known for polyesters except for the above-mentioned restrictions. The following is a preferred process for producing the liquid crystalline polyester.

First, esterification reaction and/or ester interchange reaction is performed at 100° C. to 30° C. on a mixture of aromatic dihydroxy compound (such as p-hydroxybenzoic acid, 4,4'-dihydroxybiphenyl, and hydroquinone), acetic anhydride, aromatic dicarboxylic acid (such as terephthalic acid), polyester polymer or oligomer (such as polyethylene terephthalate), and bis(β-hydroxyethyl) ester of aromatic dicarboxylic acid (such as bis(β-hydroxyethyl) terephthalate). Second, acylation is performed at 100° C. to 250° C. in the presence of an optional catalyst. Finally, polycondensation with elimination of acetic acid is performed at 250° C. to 350° C. in vacuo or under reduced pressure.

The catalyst used for polycondensation may be any known one used for liquid crystalline polyester or liquid crystalline polyester amide.

The liquid crystalline resin of the present invention should have an inherent viscosity higher than 0.03 dl/g, preferably 0.05 to 10.0 dl/g, when measured at 60° C. in a pentafluorophenol at a concentration of 0.1 g/dl.

The liquid crystalline resin of the present invention should have a melt viscosity of 1 to 2,000 Pa·s, preferably 2 to 1,000 Pa·s, which is measured by using a Koka-type flow tester under the condition that the measuring temperature is the melting point (Tm) plus 10° C. and the shear rate is 1,000 $s^{-1}$.

The melting point (Tm) is measured by differential scanning calorimetry in which the polymer sample is heated at a rate of 20° C./min from room temperature until the endothermic peak temperature (Tm1) is observed, kept at Tm1 plus 20° C. for 5 minutes, cooled down to room temperature at a rate of 20° C./min, and heated again at a rate of 20° C./min until the endothermic peak temperature (Tm2) is observed. Tm2 is the melting point.

The liquid crystalline resin of the present invention may optionally be incorporated with an inorganic filler to make it into a liquid crystalline resin composition. The inorganic filler is not specifically restricted, and it may be in the form of fiber, plate, powder, or granule. Examples of the inorganic filler are listed below.

Glass fiber, carbon fiber (derived from PAN or pitch), metal fiber (such as stainless steel fiber, aluminum fiber, and brass fiber), organic fiber (such as aromatic polyamide fiber), fibrous and whiskery fillers (such as gypsum fiber, ceramics fiber, asbestos fiber, zirconia fiber, alumina fiber, silica fiber, titanium oxide fiber, silicon carbide fiber, rock wool, potassium titanate whisker, barium titanate whisker, aluminum borate whisker, and silicon nitride whisker), and powdery, granular, and platy fillers (such as mica, talc, kaolin, silica, calcium carbonate, glass beads, glass flakes, glass microballoons, clay, molybdenum disulfide, wollastonite, titanium oxide, zinc oxide, calcium polyphosphate, and graphite). Of these examples, glass fiber is preferable. Glass fiber is not specifically restricted, and any grade for resin reinforcement can be used. It may be of long fiber type or short fiber type (chopped strand or milled fiber). The above-mentioned fillers may be used in combination with one another. In addition, the fillers may be used after surface treatment with any known coupling agent (such as silane coupling agent and titanate coupling agent).

The glass fiber may be coated or bundled with a thermoplastic resin (such as ethylene-vinyl acetate copolymer) or a thermosetting resin (such as epoxy resin).

The amount of the filler is usually 5–300 parts by weight, preferably 10 to 250 parts by weight, more preferably 20 to 150 parts by weight, for 100 parts by weight of the liquid crystalline resin.

The liquid crystalline resin of the present invention may be incorporated with ordinary additives so as to impart desired characteristic properties. Such additives include antioxidants, heat stabilizers (such as hindered phenols, hydroquinone, and phosphites and substituted products thereof), UV light absorbers (such as resorcinol, salicylate, benzotriazole, and benzophenone), slip agents and mold releases (such as montanic acid and its salt, ester, and half ester, stearyl alcohol, stearamide, and polyethylene wax), dyes (such as nigrosine), pigments (such as cadmium sulfide and phthalocyanine), nucleating agents, plasticizers, flame retardants, flame retardant auxiliaries, and antistatic agents.

Incorporation of these additives may be accomplished by ordinary melt mixing at 180° C. to 370° C. in a Banbury mixer, rubber mill, kneader, or single- or twin-screw extruder.

The liquid crystalline resin composition of the present invention may be analyzed for its components by GC-MS, LC-MS, and any other means, and then separated into its major component (liquid crystalline resin) and ancillary materials (additives and fillers) in the following manner for measurement of its absorbance by the method mentioned above. The procedure for separation starts with dissolution in pentafluorophenol. The solution is separated from insoluble matter (additives and fillers) by filtration (0.45 $\mu$m). The filtrate is given a poor solvent (such as methanol) to precipitate the liquid crystalline resin. In the case where additives in the liquid crystalline resin composition are soluble in pentafluorophenol, it is necessary to extract them from a finely ground sample by using a solvent selected from toluene, acetone, benzene, methanol, DMF, and NMP. In the case where additives in the liquid crystalline resin composition are both soluble and insoluble in pentafluorophenol, they should be removed by using the above-mentioned two methods in combination. After separation from additives and fillers, the liquid crystalline resin is measured for absorbance at 380 nm over an optical path length of 10 mm in a 0.5 wt % solution in a 1:1 mixed solvent of pentafluorophenol and chloroform (by weight).

The liquid crystalline resin and liquid crystalline resin composition obtained as mentioned above undergo ordinary molding such as injection molding, extrusion molding, and compression molding to make electrical and electronic parts, precision parts, and automotive parts. In addition, they give rise to colored products when incorporated with a coloring agent because of their good residence stability and good discoloration resistance.

The resulting molded products are superior in heat resistance, hydrolytic resistance, and color. Their examples are listed below.

electrical and electronic parts for gear, casing, sensor, LEP lamp, connector, socket, resistor, relay case, switch, coil bobbin, capacitor, variable capacitor case, optical pick-up, oscillator, terminal board, transformer, plug, printed wiring board, tuner, speaker, microphone, headphone, small motor, magnetic head base, power module, housing, semiconductor, liquid crystal, FDD carriage, FDD chassis, motor brush holder, parabolic antenna, computers, etc.

parts for VTR, television set, iron, hair dryer, rice cooker, microwave oven, audio laser disc, compact disc, lighting apparatus, refrigerator, air conditioner, typewriter, word processor, home electric appliance, office machine, office computer, telephone set, facsimile, etc.

mechanical parts for washing jig, oilless bearing, stern shaft bearing, underwater shaft, motor, lighter, typewriter, etc.

precision parts for microscope, binocular, camera, watch, etc.

automotive parts for alternator terminal, alternator connector, IC regulator, potentiometer base (for light dimmer), exhaust gas valve and other valves, fuel pipe, exhaust pipe, intake pipe, air intake manifold, fuel pump, engine coolant joint, carburetor main body, carburetor spacer, exhaust gas sensor, coolant sensor, oil temperature sensor, brake pad wear sensor, throttle position sensor, crankshaft position sensor, air flow meter, air conditioner thermostat base, heating warm air flow control valve, radiator motor brush holder, water pump impeller, turbine vane, wiper motor, distributor, starter switch, starter relay, transmission wire harness, window washer nozzle, air conditioner panel switch board, fuel solenoid valve coil, fuse connector, horn terminal, electric insulating board, step motor rotor, lamp socket, lamp reflector, lamp housing, brake piston, solenoid bobbin, engine oil filter, ignition system case, etc.

Of the above-mentioned examples, those small parts having a volume less than 5 cc can be made most practically from the liquid crystalline resin or liquid crystalline resin composition of the present invention because of their good color, heat resistance, and hydrolytic resistance. Typical examples of such small parts are SIMM sockets, DIMM sockets, CD pickup lens holders, and small gears.

COMPARATIVE EXAMPLE 1

The invention will be described in more detail with reference to the following examples, which are not intended to restrict the scope of the invention.

REFERENTIAL EXAMPLE 1

LCP1: In a pressure vessel were reacted with one another 11.05 kg of p-hydroxybenzoic acid, 1.40 kg of 4,4'-dihydroxybiphenyl, 1.25 kg of terephthalic acid, 2.40 kg of polyethylene terephthalate (having an intrinsic viscosity of ca. 0.6 dl/g), and 10.67 kg of acetic anhydride at 100–250° C. for 1.5 hoursundera nitrogen stream. With the pressure vessel evacuated to 66 Pa over 1 hour, reaction was continued for 1.25 hours so as to complete polycondensation. The reaction gave rise to a stoichiometric amount of acetic acid which was distilled away. Thus, there was obtained the desired polymer in pellet form. An absorbance of the liquid crystalline resin (LCP 1) was 1.1.

COMPARATIVE EXAMPLE 2

LCP2: In a pressure vessel were reacted with one another 11.05 kg of p-hydroxybenzoic acid, 1.40 kg of 4,4'-dihydroxybiphenyl, 1.25 kg of terephthalic acid, 2.40 kg of polyethylene terephthalate (having an intrinsic viscosity of ca. 0.6 dl/g), and 10.38 kg of acetic anhydride under the same conditions as for LCP1. However, there was not obtained the desired polymer (in pellet form) because the reaction failed to give a sufficient degree of polymerization.

EXAMPLE 1

LCP3: In a pressure vessel were reacted with one another 11.05 kg of p-hydroxybenzoic acid, 1.40 kg of 4,4'-dihydroxybiphenyl, 1.25 kg of terephthalic acid, 2.40 kg of polyethylene terephthalate (having an intrinsic viscosity of ca. 0.6 dl/g), 10.38 kg of acetic anhydride, and 28.6 g of sodium hypophosphite under the same conditions as for LCP1. There was obtained the desired polymer in pellet form. An absorbance of the liquid crystalline resin (LCP 3) was 0.1.

EXAMPLE 2

LCP4: In a pressure vessel were reacted with one another 11.05 kg of p-hydroxybenzoic acid, 1.40 kg of 4,4'- dihydroxybiphenyl, 1.25 kg of terephthalic acid, 2.40 kg of polyethylene terephthalate (having an intrinsic viscosity of ca. 0.6 dl/g), 10.38 kg of acetic anhydride, and 28.6 g of sodium phosphite under the same conditions as for LCP1. There was obtained the desired polymer in pellet form. An absorbance of the liquid crystalline resin (LCP 4) was 0.2.

EXAMPLE 3

LCP5: In a pressure vessel were reacted with one another 11.05 kg of p-hydroxybenzoic acid, 1.40 kg of 4,4'-dihydroxybiphenyl, 1.25 kg of terephthalic acid, 2.40 kg of polyethylene terephthalate (having an intrinsic viscosity of ca. 0.6 dl/g), 10.38 kg of acetic anhydride, and 57.2 g of sodium hypophosphite under the same conditions as for LCP1. There was obtained the desired polymer in pellet form. An absorbance of the liquid crystalline resin (LCP 5) was 0.1.

COMPARATIVE EXAMPLE 3

LCP6: In a pressure vessel were reacted with one another 11.05 kg of p-hydroxybenzoic acid, 1.40 kg of 4,4'-dihydroxybiphenyl, 1.25 kg of terephthalic acid, 2.40 kg of polyethylene terephthalate (having an intrinsic viscosity of ca. 0.6 dl/g), 10.67 kg of acetic anhydride, and 28.6 g of bis(4-methyl-2,6-t-butyl)pentaerythritol diphosphite (MARK PEP-36 from Adeka Argus) under the same conditions as for LCP1. There was obtained the desired polymer in pellet form. An absorbance of the liquid crystalline resin (LCP 6) was 0.9.

COMPARATIVE EXAMPLE 4

LCP7: In a pressure vessel were reacted with one another 11.05 kg of p-hydroxybenzoic acid, 1.40 kg of 4,4'-dihydroxybiphenyl, 1.25 kg of terephthalic acid, 2.40 kg of polyethylene terephthalate (having an intrinsic viscosity of ca. 0.6 dl/g), 10.67 kg of acetic anhydride, and 28.6 g of 2,2-methylenebis(4,6-di-t-butylphneyl)octyl phosphite (MARK HP-10 from Adeka Argus) under the same conditions as for LCP1. There was obtained the desired polymer in pellet form. An absorbance of the liquid crystalline resin (LCP 7) was 0.9.

COMPARATIVE EXAMPLE 5

LCP8: In a pressure vessel were reacted with one another 11.05 kg of p-hydroxybenzoic acid, 1.40 kg of 4,4'-dihydroxybiphenyl, 1.25 kg of terephthalic acid, 2.40 kg of polyethylene terephthalate (having an intrinsic viscosity of ca. 0.6 dl/g), 10.67 kg of acetic anhydride, and 28.6 g of calcium hypophosphite under the same conditions as for LCP1. There was obtained the desired polymer in pellet form. An absorbance of the liquid crystalline resin (LCP 8) was 0.55.

The polymer samples obtained as mentioned above were evaluated in the following manner.
(1) Absorbance The sample was dissolved in pentafluorophenol and chloroform mixed in a ratio of 1:1 (by weight) to give a 0.5 wt % solution. The solution was placed in a quartz glass cell having an optical path length of 10 mm. The intensity of transmitted light and the intensity of incident light were measured at 380 nm using a spectrophotometer (Model UV-240 made by Shimadzu Corporation), with the mixed solvent being a blank. The absorbance was calculated from the formula below.

$$\text{Absorbance} = -\log \frac{\text{Intensity of transmitted light}}{\text{Intensity of incident light}}$$

(2) Whiteness (W value) and yellowness (YI value)

Bend test specimens (measuring 127×12.7×3.12 mm) were prepared by using "Promat 25/40" (from Sumitomo Heavy Industries, Ltd.) at a cylinder temperature of 325° C. and a mold temperature of 90° C. These specimens were tested for whiteness (W value) by using an SM color computer made by Suga Shikenki K.K.

(3) Residence stability

Bend test specimens (measuring 127×12.7×3.12 mm) were prepared by using "Promat 25/40" (from Sumitomo Heavy Industries, Ltd.) at a cylinder temperature of 330° C. and a mold temperature of 90° C., with the residence time set at 4 minutes and 20 minutes. These specimens were tested for flexural strength according to ASTM D790. The retention of strength was calculated from the formula below.

$$\text{Retention} = \frac{\text{Strength for 20 minutes residence}}{\text{Strength for 4 minutes residence}} \times 100$$

(4) Heat resistance (aging) test

Tensile test specimens (conforming to ASTM No. 1) were prepared by using Toshiba's IS-55EPN at a cylinder temperature of 325° C. and a mold temperature of 90° C. After aging at 240° C. in a hot-air oven for 30 days, the specimens were measured for tensile strength according to ASTM D638. The retention of tensile strength was calculated from the formula below.

$$\text{Retention} = \frac{\text{Strength after aging}}{\text{initial strength}} \times 100$$

(5) Hydrolytic resistance test

Tensile test specimens (conforming to ASTM No. 1) were prepared by using Toshiba's IS-55EPN at a cylinder temperature of 325° C. and a mold temperature of 90° C. After treatment with water in an autoclave at 120° C. for 3 days, the specimens were measured for tensile strength according to ASTM D638. The retention of tensile strength was calculated from the formula below.

$$\text{Retention} = \frac{\text{Strength after treatment}}{\text{Initial strength}} \times 100$$

(6) Evolution of acetic acid

A sample (0.3 g) was allowed to stand at 330° C. for 30 minutes in an evacuated (10 Torr) test tube (50 mm in diameter). The pressure in the test tube was restored by introduction of nitrogen, and the gas in the test tube was analyzed for acetic acid by using an acetic acid detecting tube (No. 81) made by Gastech Co., Ltd.

EXAMPLES 4 TO 6 AND COMPARATIVE EXAMPLES 6 TO 9

Each of the polymer samples (LCP 1 and LCP 3 to 8) prepared in Examples 1 to 3 and Comparative Examples 1 and 3 to 5 was dry-blended with an inorganic file (glass fiber having 9 $\mu$m $\phi$ and 3 mm length) in the ratio shown in Table 1. The dry blend underwent melt mixing in a 30-nm twin-screw extruder. Resulting pellets were formed into test pieces for performance assessment. The absorbance and the evolution of acetic acid were measured before blending. The results are shown in Table 1.

TABLE 1

| | Liquid crystalline resin (molar ratio of acetic anhydride) (100 pbw) | Absorbance | Inoranic filler (pbw) | Color tone | | Retention of strength (%) (stability to residence) | Retention of strength (%) (after heat aging) | Retention of strength (%) (hydrolytic resistance) | Evolution of acetic acid (ppm/g) |
|---|---|---|---|---|---|---|---|---|---|
| | | | | W value | YI value | | | | |
| Example 1 | LCP3 (1.07) | 0.1 | 50 | 79 | 25 | 95 | 80 | 85 | 40 |
| Example 2 | LCP4 (1.07) | 0.2 | 50 | 77 | 26 | 94 | 78 | 85 | 42 |
| Example 3 | LCP5 (1.07) | 0.1 | 50 | 80 | 25 | 96 | 82 | 85 | 35 |
| Comparative Example 1 | LCP1 (1.11) | 1.1 | 50 | 63 | 43 | 85 | 45 | 65 | 400 |
| Comparative Example 2 | LCP6 (1.11) | 0.9 | 50 | 60 | 25 | 75 | 45 | 60 | 420 |
| Comparative Example 3 | LCP7 (1.11) | 0.8 | 50 | 72 | 37 | 80 | 48 | 65 | 420 |
| Comparative Example 4 | LCP8 (1.11) | 0.55 | 50 | 72 | 33 | 90 | 80 | 75 | 55 |

It is noted from Table 1 that the liquid crystalline resin composition of the present invention is greatly improved in color tone, heat resistance (stability to residence and heat aging), and hydrolytic resistance.

What is claimed is:

1. A liquid crystalline resin which comprises at least one kind of liquid crystalline polymer selected from liquid crystalline polyester and liquid crystalline polyester amide, both forming an anisotropic molten phase, and at least one inorganic phosphorus compound selected from phosphorous acid, phosphinic acid, and metal salts thereof in an amount of 0.001 to 5 parts by weight for 100 parts by weight of the liquid crystalline polymer, said liquid crystalline resin having an absorbance of 0.5 or less at 380 nm when measured over an optical path length of 10 mm in a 0.5 wt % solution in a 1:1 mixed solvent of pentafluorophenol and chloroform (by weight).

2. The liquid crystalline resin as defined in claim 1, in which at least one member selected from phosphorous acid, phosphinic acid, and metal salts thereof is a sodium salt of phosphorous acid and/or phosphinic acid.

3. The liquid crystalline resin as defined in claim 1 or 2 which comprises a liquid crystalline polyester composed of structural units represented by the formulas (I), (II), and (IV) below or a liquid crystalline polyester composed of structural units represented by the formulas (I), (II), (III), and (IV) below, $$-\!\!\left(\!O\!-\!\!\!\bigcirc\!\!\!-\!\!C\!\right)\!\!- \quad (I)$$
$$\phantom{xxxxxxxxxxxxxxxxxxxx}\|$$
$$\phantom{xxxxxxxxxxxxxxxxxxxx}O$$

$$-(O-R_1-O)- \quad (II)$$

$$-(O-CH_2CH_2-O)- \quad (III)$$

-continued

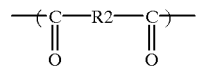

where $R_1$ denotes at least one kind of the group selected from those represented by the formulas below,

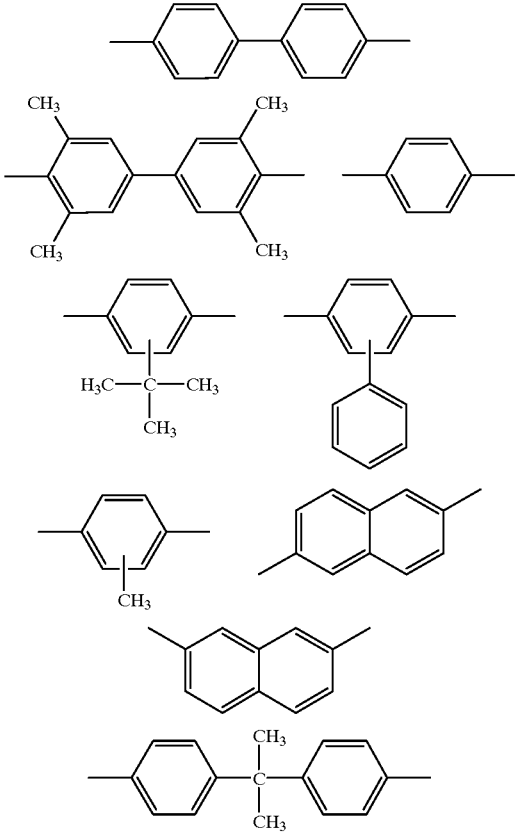

-continued

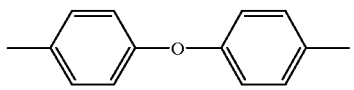

and $R_2$ denotes at least one kind of the group selected from those represented by the formula below,

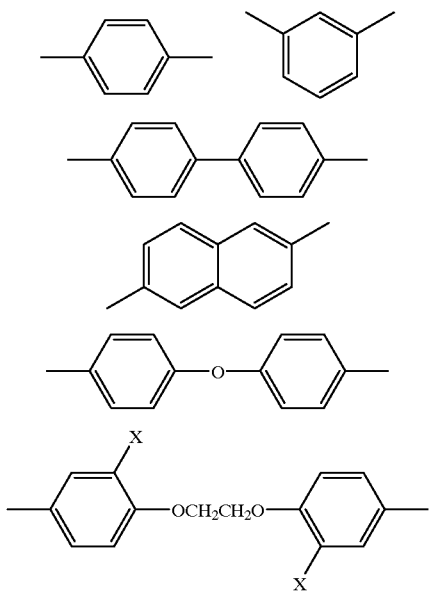

with X standing for a hydrogen atom or chlorine atom.

4. A liquid crystalline resin composition which comprises a liquid crystalline resin in an amount of 100 parts by weight and an inorganic filler in an amount of 5 to 300 parts by weight, said liquid crystalline resin being composed of at least one kind of liquid crystalline polymer selected from liquid crystalline polyester and liquid crystalline polyester amide, both forming an anisotropic molten phase, and at least one inorganic phosphorus compound selected from phosphorous acid, phosphinic acid, and metal salts thereof in an amount of 0.001 to 5 parts by weight for 100 parts by weight of the liquid crystalline polymer, said liquid crystalline resin having an absorbance of 0.5 or less at 380 nm when measured over an optical path length of 10 mm in a 0.5 wt % solution in a 1:1 mixed solvent of pentafluorophenol and chloroform (by weight).

5. An improved process for producing a liquid crystalline resin including the steps of reacting a liquid crystalline polyester-forming raw material and/or a liquid crystalline polyester amide-forming raw material containing at least one member selected from hydroxycarboxylic acids, dihydroxy compounds, and dicarboxylic acids in the presence of an acylating agent, thereby producing a liquid crystalline polyester and/or liquid crystalline polyester amide, wherein the improvement comprises adding at least one kind of compound selected from phosphorous acid, phosphinic acid, and metal salts thereof in an amount of 0.001 to 5 parts by weight for 100 parts by weight of the liquid crystalline polymer, and adjusting the amount of the acylating agent such that the molar ratio of the functional groups in the acylating agent capable of acylating hydroxyl groups to the hydroxyl groups in the starting monomer is less than 1.1.

6. The process for producing a liquid crystalline resin as defined in claim 5, wherein the liquid crystalline polyester-forming raw material and/or a liquid crystalline polyester amide-forming raw material is one which further contains at least one member selected from polyalkylene terephthalate and amino group-containing monomer.

7. A molded product of a liquid crystalline resin or a liquid crystalline resin composition, said liquid crystalline resin comprising at least one kind of liquid crystalline polymer selected from liquid crystalline polyester and liquid crystalline polyester amide, both forming an anisotropic molten phase, and at least one inorganic phosphorus compound selected from phosphorous acid, phosphinic acid, and metal salts thereof in an amount of 0.001 to 5 parts by weight for 100 parts by weight of the liquid crystalline polymer, said liquid crystalline resin having an absorbance of 0.5 or less at 380 nm when measured over an optical path length of 10 mm in a 0.5 wt % solution in a 1:1 mixed solvent of pentafluorophenol and chloroform (by weight), and said liquid crystalline resin composition comprising a liquid crystalline resin in an amount of 100 parts by weight and an inorganic filler in an amount of 5 to 300 parts by weight.

8. The molded product of liquid crystalline resin as defined in claim 7, wherein the molded product has a volume of less than about 5 cubic centimeters.

* * * * *

UNITED STATES PATENT AND TRADEMARK OFFICE
CERTIFICATE OF CORRECTION

PATENT NO. : 5,980,777
DATED : November 9, 1999
INVENTOR(S) : Umetsu et al

It is certified that error appears in the above-identified patent and that said Letters Patent is hereby corrected as shown below:

In column 9 at approximately line 64, please change "30°" to -- 300° -- .

In column 15, at the first line, after "30-", please change "nm" to -- mm -- .

Signed and Sealed this

Twelfth Day of September, 2000

Attest:

Q. TODD DICKINSON

Attesting Officer

Director of Patents and Trademarks